(12) United States Patent
Yarkosky et al.

(10) Patent No.: US 8,929,195 B1
(45) Date of Patent: Jan. 6, 2015

(54) METHOD AND SYSTEM OF REUSING WALSH CODES TO INCREASE FORWARD CHANNEL CAPACITY

(75) Inventors: Mark Yarkosky, Overland Park, KS (US); Shiva Narayanabhatla, Overland Park, KS (US); John Cheong-Wai Ngan, Shawnee, KS (US); Dae-Sik Oh, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 1770 days.

(21) Appl. No.: 11/126,499

(22) Filed: May 11, 2005

(51) Int. Cl.
*H04J 11/00* (2006.01)
*H04B 7/216* (2006.01)
*H04B 15/00* (2006.01)
*H04W 40/00* (2009.01)

(52) U.S. Cl.
USPC ............. 370/208; 370/335; 455/62; 455/446

(58) Field of Classification Search
USPC .......... 370/208, 209, 335, 342, 441; 455/101, 455/562.1, 447, 432.1–453, 62
See application file for complete search history.

(56) References Cited

U.S. PATENT DOCUMENTS

| | | | |
|---|---|---|---|
| 5,185,739 A * | 2/1993 | Spear | 370/337 |
| 6,038,263 A * | 3/2000 | Kotzin et al. | 370/208 |
| 6,181,276 B1 * | 1/2001 | Schlekewey et al. | 342/372 |
| 6,360,107 B1 * | 3/2002 | Lin et al. | 455/562.1 |
| 7,499,391 B2 * | 3/2009 | Cleveland | 370/203 |
| 2001/0036843 A1 * | 11/2001 | Thompson | 455/562 |
| 2002/0089950 A1 * | 7/2002 | Sourour et al. | 370/335 |
| 2002/0146029 A1 * | 10/2002 | Kavak et al. | 370/441 |
| 2003/0087640 A1 * | 5/2003 | Rotstein et al. | 455/446 |
| 2003/0114162 A1 * | 6/2003 | Chheda et al. | 455/447 |
| 2004/0203857 A1 * | 10/2004 | Wang | 455/456.1 |
| 2004/0252665 A1 * | 12/2004 | Clark et al. | 370/335 |
| 2004/0258027 A1 * | 12/2004 | Tsybakov et al. | 370/335 |

* cited by examiner

*Primary Examiner* — Wesley Kim

(57) ABSTRACT

Assigning CDMA channel codes in a multiple beam zone sector such that they may be reused within the same sector. In an exemplary embodiment, the method includes configuring directional antennas in a cell sector to provide multiple beam zones in a cell sector and assigning channel codes for use within the beam zones such that each channel code is assigned for use in only one beam zone of any set of three consecutive beam zones in the cell sector. The reassignment is preferable conditioned upon the mobility status of the user. This effectively reduces the inter-user interference by ensuring at least two intervening beam zones are located between zones that are using the same channel codes, and that the second user is not mobile. The channel codes may be Walsh codes or quasi-orthogonal functions (QOFs).

11 Claims, 7 Drawing Sheets

| | GROUP A WALSH CODES 1-21 |
| --- |
| | GROUP B WALSH CODES 22-42 |
| | GROUP C WALSH CODES 43-64 |

| | CC1 | | CC2 | | CC3 | |
|---|---|---|---|---|---|---|
| | AS | AV | AS | AV | AS | AV |
| BZ1 | 1 | 0 | 0 | 0 | 1 | 0 |
| BZ2 | 0 | 0 | 0 | 0 | 0 | 0 |
| BZ3 | 0 | 0 | 1 | 0 | 0 | 0 |
| BZ4 | 0 | 1 | 0 | 0 | 1 | 0 |
| BZ5 | 0 | 1 | 0 | 0 | 0 | 0 |
| BZ6 | 0 | 1 | 0 | 1 | 0 | 0 |

METHOD AND SYSTEM OF REUSING WALSH CODES TO INCREASE FORWARD CHANNEL CAPACITY

BACKGROUND

A. Field of Invention

The present invention is related to wireless communication systems, and more particularly, to a method and system of utilizing Walsh codes in a sectorized CDMA cellular communication system having multiple beam zones.

B. Description of Related Art

In a typical wireless communication system, an area is divided geographically into a number of cell sites, each defined by one or more radiation patterns created by an emission of radio frequency (RF) electromagnetic (EM) waves from a respective base transceiver station (BTS) antenna. Each cell site is typically further divided into two, three, or more sectors, where the sectors provide radio coverage for a selected area within the cell site. Each sector of the cell typically uses dedicated antennas to provide the required coverage.

In CDMA communication systems, each sector uses a unique PN code (commonly referred to as a short PN code offset) to distinguish itself from surrounding sectors and cells. Within each sector, channels are distinguished by yet another code, termed a Walsh code. In an adjacent sector, the Walsh codes may be reused because channel separation is provided by a different offset of the short PN code for that sector. Thus, the number of available forward channels (BTS to MS) on a given carrier frequency in a sector is limited by the number of available Walsh codes. In the ANSI/TIA/EIA-95-B-99 standard entitled "Mobile Station-Base Station Compatibility Standard for Wideband Spread Spectrum Cellular Systems" (published Feb. 1, 1999), the contents of which are incorporated by reference herein, there are sixty-four available Walsh codes, while in CDMA 2000 series (TIA/EIA IS-2000 Series, Rev. A, published Mar. 1, 2000), one hundred twenty-eight Walsh codes are available. Both of the ANSI/TIA/EIA-95-B-99 and the TIA/EIA IS-2000 Series, Rev. A, standards are incorporated herein by reference, and are available from the Telecommunication Industry Association, 2500 Wilson Boulevard, Suite 300, Arlington, Va. 22201.

The maximum number of forward channels for a single RF carrier is therefore fixed in a given CDMA cell site having a particular sector topology. To increase system capacity, quasi-orthogonal functions (QOF) may be used to supplement the available Walsh codes. QOFs are derived from Walsh codes, and are not perfectly orthogonal to the set of Walsh codes. Nevertheless, they provide a relatively low level of inter-user cross-correlation interference that makes them suitable for use when extra capacity is needed. Techniques of generating QOFs are well known, and are based on a mask value and masking function, from which an entire set of QOFs may be generated by masking the original set of Walsh codes. Accordingly, each QOF mask may be used to generate a QOF set.

Oftentimes, however, the capacity of the system is reached before all of the Walsh codes have been used due to interference between the CDMA users in a sector or nearby sectors. To reduce interference, smart antennas may be used to limit the amount of signal power received from interfering users.

A smart antenna may actually be an array of antenna elements working together to produce a particular radiation pattern. Each antenna in the array is referred to as an antenna element (or simply an element). An antenna radiation pattern is also referred to as an antenna-beam or beam zone. A beam width of an antenna is a measure of directivity of an antenna and is usually defined by angles where the radiation pattern reduces to one half of its peak value or more commonly referred to as 3 db points (i.e., 3 decibel power level). Using sophisticated antenna arrays, a given sector may be divided into directional sub-sectors covered by one or more beam zones.

The use of smart antennas to reduce interference may allow an increase in system capacity. However, the number of available Walsh codes in conjunction with the QOFs, may still limit a sector's capacity. Consequently, a system that overcomes these limitations is desirable.

SUMMARY

Provided is a method of assigning CDMA channel codes in a multiple beam zone sector such that they may be reused within the same sector. In an exemplary embodiment, a method is provided that includes configuring directional antennas in a cell sector to provide multiple beam zones in a cell sector and assigning channel codes for use within the beam zones such that each channel code is assigned for use in only one beam zone of any set of three consecutive beam zones in the cell sector. This effectively reduces the inter-user interference by ensuring at least two intervening beam zones are located between zones that are using the same channel codes. The channel codes may be Walsh codes or quasi orthogonal functions (QOFs). If a given channel code is in use by a first user within a sector, then before assigning the same channel code to a second user within a different beam zone, the system preferably checks to determine whether the second user is moving (changing its physical location) or fixed. In the event that the second user is fixed, then the particular channel code may be assigned to the second user. If, however, the second user is moving, the channel code will not be additionally assigned to the second user, thereby reducing the possibility of degraded service when the user moves closer to the beam zone where the channel code is already in use.

In some embodiments, the channel codes are dynamically assigned to the beam zones, while in alternative embodiments they are statically assigned. In embodiments using dynamic assignment, the method includes tracking currently assigned channel codes and channel code availability for each of the two or more beam zones. Various techniques may be used to determine channel code availability, such as by tracking the channel code usage in adjacent beam zones. If the sector has numerous beam zones, the method may examine up to four or more adjacent beam zones within the sector to ensure interference is minimized.

Overall system capacity may be reserved by limiting the number of codes that are assigned to a particular code group, or beam zone. This may be done by setting a maximum number of channel codes that may be used in any beam zone of the sector. In addition, the maximum number of channel codes for each beam zone may be dynamically adjusted, based on the time of day, the number of calls, or other sector and cell-specific statistics.

In embodiments using static assignment of channel codes, the assignments may nonetheless be periodically modified, such as every few minutes, or hours.

In certain embodiments, code management is performed by statically or dynamically assigning channel codes to certain groups, where each group is intended for use in predetermined beam zones, where the beam zones are arranged so that beam zones using the same code group are separated by at least two intervening beam zones in the cell sector. In other embodiments, groups are not maintained, but instead the use of codes and their availability for use is determined by examining current channel code assignments within the relevant adjacent beam zones.

These as well as other features and advantages of the present invention will become apparent to those of ordinary skill in the art by reading the following detailed description, with appropriate reference to the accompanying drawings.

BRIEF DESCRIPTION OF FIGURES

Reference is made to the attached drawings, wherein elements that have the same reference numeral designations represent like elements throughout and wherein.

DETAILED DESCRIPTION OF EXEMPLARY EMBODIMENTS

A. Wireless Communication System

Figure 1:
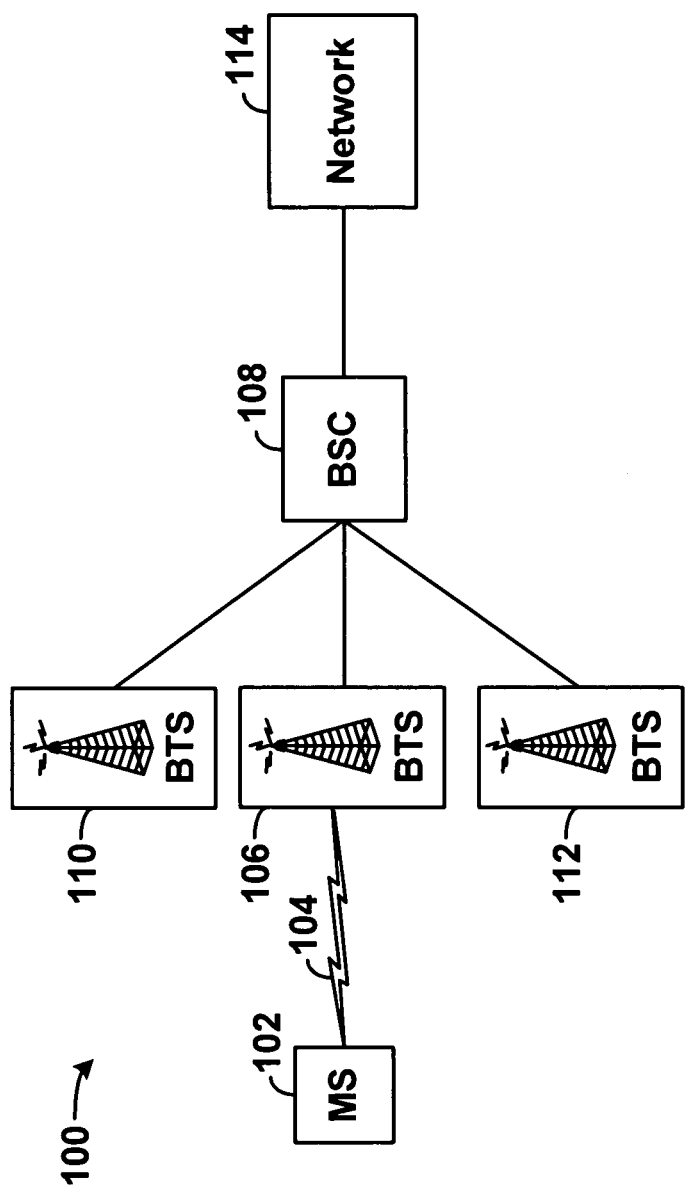
FIG. 1 is a block diagram illustrating one embodiment of a wireless communication system.

In accordance with an exemplary embodiment, a method and system of assigning Walsh codes for use within a wireless communication system is provided. Referring to FIG. 1, a block diagram illustrating one embodiment of a wireless communication system 100 is provided. It should be understood that this and other arrangements described herein are set forth for purposes of example only, and other arrangements and elements can be used instead and some elements may be omitted altogether. Further, as in most telecommunications applications, those skilled in the art will appreciate that many of the elements described herein are functional entities that may be implemented as hardware, firmware and/ or software, and as discrete components or in conjunction with other components, in any suitable combination and location.

By way of example, the wireless communication system 100 is shown to include a mobile station (MS) 102 in communication via an air interface 104 with a base transceiver station (BTS) 106, which is coupled to a base station controller (BSC) 108. The BSC 108 is also coupled to a network 114. Mobile stations such as cellular telephones, personal digital assistants (PDA), wireless modems, or other mobile nodes may be used in the wireless communication system 100.

BTS 106 includes one or more antennas arranged to produce radiation patterns defining one or more sectors. Additional BTSs 110 and 112 coupled to BSC 108 are also illustrated. Although three BTSs are illustrated within FIG. 1, it will be understood that more or fewer BTSs may be present within the wireless communication system 100.

BSC 108 is an interface between BTSs 106, 110, and 112 and the network 114. BSC 108 also handles radio resource management and radio network management functions for BTSs 106, 110, and 112.

The network 114 may be any transport network and/or entity used to route signals to and from the MS 102. For example, network 114 may comprise a mobile switching center (MSC), a packet data service node (PDSN), an Internet protocol (IP) network, the public switched telephone network (PSTN), or any other wireless communication transport network. In addition, network 114 may allow for connectivity to multiple switching platforms, such as a short message service center (SMSC) and an uplink server, for example.

Each of the couplings of the wireless communication system 100, excluding the air interface 104, may be interfaces using various physical, media access, and data link layer technologies, including such technologies as TDM trunks (e.g., trunk level 1 (T1) line), a packetbased link (e.g, IEEE 802.3, gigabit Ethernet line), or other connections.

The wireless communication system 100 may be divided geographically into a number of cell sites. At the core of each cell site is a BTS, such as BTSs 106, 110, and 112, whose antennas define a radio frequency (RF) radiation pattern. Further, each cell site may be divided into a number of sectors, each defined respectively by radiation patterns from directional antenna elements of the cell site's BTS. Each sector typically has a beam width of about 120 degrees. However, sectors can have any desired beam width.

The radiation pattern of each sector in a cell site produces an air interface that defines a respective coverage area, such as air interface 104. When an MS is positioned within such a coverage area, the air interface provides a communication path between the MS and the BTS. And the MS can then communicate through this path with entities on the wireless communication system 100.

In the wireless communication system 100, the BTSs 106, 110, and 112 may transmit signals using one or more carrier frequencies. A carrier frequency (or simply carrier) is a transmitted electromagnetic pulse or wave at a steady frequency of alternation on which information can be imposed by increasing signal strength, varying the frequency, varying the wave phase, or other means. This variation is referred to as modulation.

In a typical CDMA wireless communication network, a subscriber connects to the base station and the network infrastructure by way of two separate wireless channels—one from the BTS to the MS, typically referred to as the forward channel, and one from the MS to the BTS, or the reverse channel. The forward and reverse channels have different formats and utilize different physical and link layer signaling. As a result, the channel characteristics, including their overall capacity in terms of the number of channels available may vary between the forward and reverse channels.

Each channel in a CDMA system is identified by a number of parameters, including the frequency of the RF carrier, and various PN sequences that are sequentially applied to the data. In particular, the forward channel uses a long PN code sequence to scramble the data, and a short PN code with a time offset that defines the sector. That is, all forward channels in a given sector use the same PN short code with the same offset. Other sectors may utilize the same short PN code, but with a different offset.

In addition, each forward channel in a sector uses a specific PN Walsh code to identify data for a given user. The orthogonality of the Walsh codes separates the user channels within a given sector. In IS 95, there are sixty-four Walsh codes—one is used as a pilot, one (or from one to seven) is used for paging, and one is used for sync, leaving as many as sixty-one Walsh codes for sixty-one forward channels per sector. IN CDMA 2000, 128 Walsh codes are available. In either system, adjacent sectors may use the same set of Walsh codes due to the use of different short PN code offsets in those sectors.

For the reverse channel, the various PN codes are used in a different manner. First, each MS uses the Walsh codes as a symbol alphabet, whereby up to six data bits may be combined and represented by a single Walsh code. The short code is then applied, and is used for synchronization purposes. Finally, the individual user channels are identified by the offset of the long code. More particularly, the specific long code used to identify the MS's channel is made by "masking" the PN long code by a number determined mathematically by the handset's ESN. With over forty days of 1,228,800 chips/ second to choose from, there are billions and billions of reverse traffic channels possible. Of course, reverse access channels are associated with each paging channel in the forward direction, which are publicly-defined long code offsets reserved for reverse-direction public traffic such as call originations, registrations, etc. After a BTS recognizes an MS on an access channel, its identity is known and the BTS redirects the MS to a traffic channel where it will use its own natural long code.

B. Types of Antennas

Figure 2:
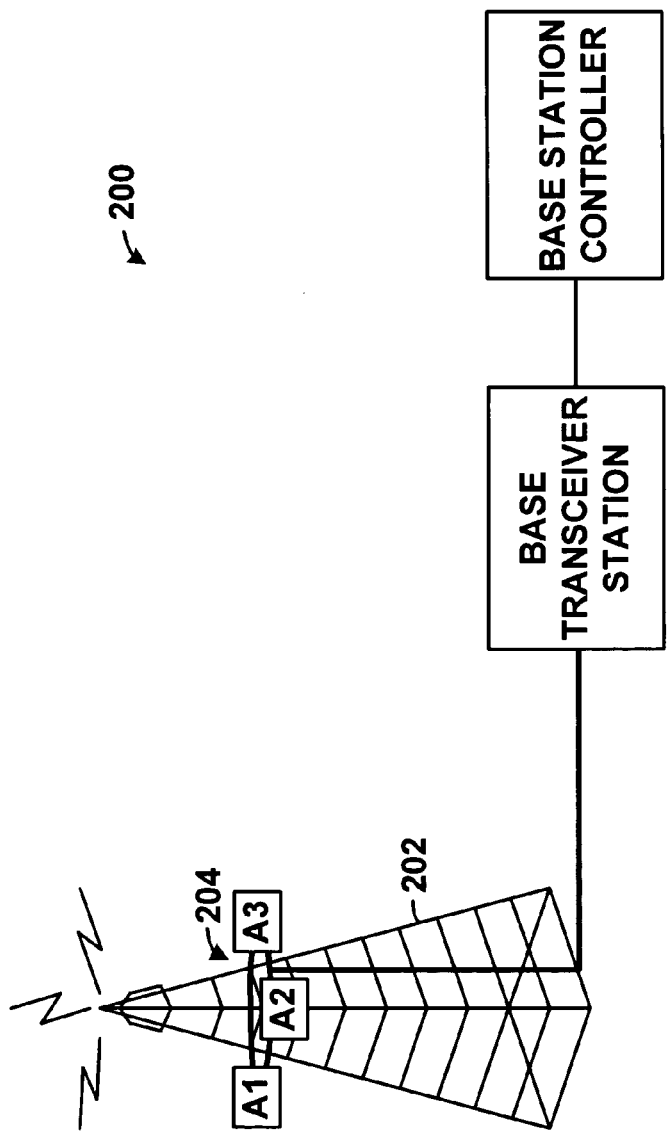
FIG. 2 illustrates one embodiment of a cell site.
Figure 3:
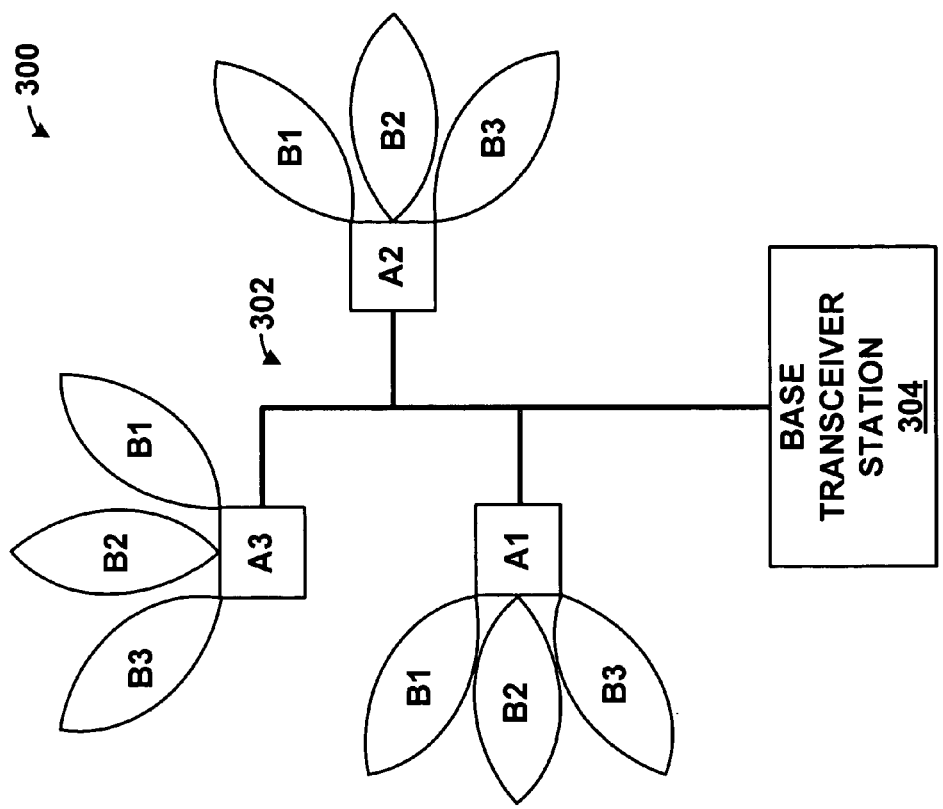
FIG. 3 illustrates a cell site radiation pattern having multiple sectors and beam zones.

In one embodiment, the antennas of the antenna-arrangement 204 illustrated in FIG. 2, the antennas of the antenna-arrangement 302 illustrated in FIG. 3 are directional adaptive beam-forming antennas. An adaptive antenna array (AAA) arrangement can adjust to an RF environment as it changes, and dynamically alter radiation patterns to optimize the performance of a wireless communication system. The AAA typically uses a phased array of antenna elements to perform beam steering and null steering.

For the receive function of the base transceiver station, the adaptive antenna-arrangement may isolate interfering signals by calculating their directions of arrival. Specifically, by adjusting how the signals from the elements are combined, the BTS/AAA can adjust the main lobes and the nulls of the radiation pattern to maximize the signal to noise ration of the desired signal and minimize the interference from other users. The adaptive antenna-arrangement can update its beam pattern in real time based on changes in both the desired and interfering signal locations.

To perform these functions, the AAA requires information about locations and RF power levels for the MSs in the coverage area. In addition, knowledge of the relevant Walsh codes, PN code offsets, and synchronization information is used. Together with the direction of arrival of the interference and the location of the desired user, the AAA calculates the optimal weighting to apply to the individual antenna elements to place the peaks and nulls of the radiation pattern. The proper weights may be determined, for example, with least-mean-squared (LMS) or normalized LMS (NLMS) algorithms.

In some antennae systems, each beam zone may operate using signaling having a timing offset. By examining the timing aspects of the signal received from the MS, the antenna system may be able to determine which beam zone the MS is receiving. In turn, this provides the system with location information. Alternative techniques of determining location information relating to the MS is understood by those of skill in the art. The location information may be analyzed over time to determine a mobility status of the MS. That is, changes in the location information may be used to determine whether a mobile station is substantially stationary, which may be the case when there are no changes in location information, or the changes are below a predetermined threshold. The threshold may be in terms of angular variance of the location information, which would be indicative of the rate of movement from one beam zone area to another adjacent beam zone. The threshold may also be determined in relation to an expected average call time, such that the threshold is related to the amount of angular deviation in the position information that indicates that during the time interval of an average call, the MS would not move from one sector to another.

On the transmitter side, location information (e.g., based on desired fixed beam configurations or information from the receive antenna configuration, possibly including beam zone information, the element weights and resulting receive radiation pattern, etc.) may be used to form transmit beams. The beam forming on the forward link decreases the amount of interference received by other MSs in the system, thereby allowing increased power levels to be used for a given MS.

The antennas of the antenna-arrangement 204 and/or the antennas of the antenna-arrangement 402 may also be fixed-beam or switched-beam antenna-arrangements that may provide individual coverage areas or overlapping coverage areas. A fixed-beam antenna may consistently provide a similar beam that has a substantially unchanging shape and beam width so that mobile stations within the beam may be provided a communication medium by the antenna. A switched-beam antenna-arrangement may divide coverage areas into several smaller coverage areas. Each portion of a coverage area is provided by a predetermined fixed-beam pattern with the greatest sensitivity located in the center of the beam and less sensitivity elsewhere. The switched-beam antenna-arrangement allows one of several predetermined fixed-beam patterns (based on weighted combinations of antenna outputs) with the greatest output power to be selected to provide a communication interface between an MS and a BTS. The switched-beam antenna-arrangement switches its beam in different directions throughout space by changing phase differences of signals used to control the antenna-arrangements.

If adaptive or switched-beam antennas are employed, one antenna may provide a communication medium for essentially only one MS, because the antennas dynamically direct their beams to provide a changing coverage area for the MS. As the MS moves, the antennas adjust the shape and width of their beams to accommodate the MS. Alternatively, if fixed-beam antennas are employed, multiple mobile stations may concurrently use the antennas.

As another example, dual-band antennas may be used. For example, antennas designed to transmit within the frequency bands of 824-896 MHz and 1850-1990 MHz may be used. Also, dual band antennas such as a 2.4/5.8 GHz dual-band antenna designed for Bluetooth/IEEE-802.11a facility applications may be used in particular for an in-building wireless communication system for mobile stations that subscribe to multiple services. Other types of antennas may be used as well.

A commercially developed intelligent antenna technology that is suitable for use with the methods and apparatus described herein is one provided by Nortel Networks. Nortel's system is referred to as Adaptive Antenna Beam Selection (AABS) technology.

A further alternative antenna technology suitable for use is Lucent's "Bell Labs Layered Space Time" (BLAST) technology as described in U.S. Pat. No. 6,317,466, the contents of which are incorporated herein by reference.

C. Channel Code Assignment

As described above, forward channels in a given sector are determined based in part on the Walsh code (short code PN offset and carrier frequency are also factors). The channel codes may be sixty-four or one-hundred-twenty-eight chip Walsh codes or quasi orthogonal functions (QOFs), as described above and in the IS-95 and CDMA-2000 specifications.

In an exemplary embodiment, a method of increasing the number of available forward channels in a sector is provided that includes configuring directional antennas in a cell sector to provide multiple beam zones in a cell sector and assigning channel codes for use within the beam zones. The channel codes are assigned such that they may be reused within a single sector. In one embodiment, this is achieved by ensuring that a given code is used in only one beam zone of any set of three consecutive beam zones in the cell sector. In addition, in one preferred embodiment, a given channel code will not be assigned to a second user if the second user is mobile. If the second user is stationary, then a channel code that is already in use within the sector (but in another beam zone) may be re-used. By restricting the re-use of channel codes to fixed users, the possibility of interference is reduced.

Figures 4, 5A, 5B:
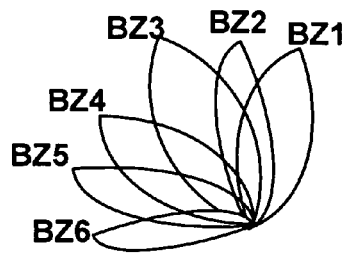
FIG. 4 illustrates adaptive beam zones in a single sector.
FIGS. 5A and 5B illustrate alternative methods of assigning channel codes.

As shown in FIG. 4, beam zones BZ1-BZ6 may all serve a single sector and provide overlapping coverage for MSs within the sector's area. Assignment of channel codes is performed whereby codes used within a sector, say BZ3, are not used within immediately adjacent zones BZ2 and BZ4. This pattern of reuse provides a buffer region between beam zones. Preferably, codes used in BZ3 are also not used in the next adjacent zones BZ1 or BZ5 to provide a larger buffer region between zones using the same channel codes.

Because beam zones typically overlap, the provision of a buffer (intervening beam zones between zones using the same channel code) reduces inter beam zone interference. That is, if a buffer region were not provided, an MS receiving signals from a first beam zone on a given channel code may inadvertently receive signal energy transmitted with the same channel code from an overlapping adjacent beam zone. This signal energy would not be orthogonal, and would not be eliminated by the channel code despreading operation in the MS CDMA receiver.

In addition, providing a larger buffer (two or more intervening beam zones) between channel code re-use will further decrease the possibility that a mobile will receive interfering signals. Specifically, it is not uncommon for three beam zones to overlap. In such a situation, an MS may be assigned channel codes for the beam zone servicing it as well as adjacent beam zones on either side for use in a hand-off. As an example of how a single beam zone buffer may be insufficient, consider the case where an MS in BZ3 is assigned a first channel code for use in BZ3, and is also assigned a second channel code to monitor in BZ2 for possible use (e.g., for use in a handoff). If the second channel code were also active in BZ4, then the MS would be unable to separate signal energy encoded with the second channel code from BZ1 and BZ4. Thus, it can be seen that in many situations, a two beam zone buffer is preferable to reduce the inter-user interference.

In embodiments where channel code re-use is restricted based on the mobility of the user, the beam zone buffers may be decreased. This is particularly the case if it is determined that both users (the first user assigned a given channel code, and the second user that is requesting a new channel code assignment) are determined to be stationary, or fixed.

In certain embodiments, code management is performed by statically or dynamically assigning channel codes to certain groups. The groups may be maintained in a simple table format, as shown in FIG. 5A. Of course, this may take many forms when implemented in software at the BSC and/or BTS and/or beam zone antenna system. Regardless of where the assignments are managed, each group is intended for use in predetermined beam zones. The groups are arranged so that beam zones using the same code group are separated by a buffer of at least one, but preferably at least two intervening beam zones in the cell sector. The number of desired intervening beam zones may vary depending on the extent of overlap between the beam zone regions. The number of beam zones and the amount of overlap may be determined in advance based on the cell and sector layout, especially if fixed beam antennas are used. In alternative embodiments, especially when adaptive beam antennas are used, the beam zones may be determined based in part or entirely on geographic regions. The geographic regions may be predetermined areas, with fixed boundaries, or may be adaptable in response to changes in antenna radiation patterns.

The selection of channel codes within the groups may be static or dynamic. In some embodiments, the channel codes are selected for inclusion in a certain group, and the groups are assigned to specific beam zones. The code and group selections may be made based on the desired capacity of the beam zones within the sector. Then, channel code assignment for particular users is performed by examining the availability of the codes within the assigned group.

For dynamic grouping, the groups are modified or updated periodically, such as every few minutes, or hours. Groups may be modified based on changes in call traffic loads in specific beam zones. In this way, additional codes may be added to a beam zone to provide additional capacity when needed. In such a scenario, the code group management algorithm may include provisions to limit the number of codes that may be assigned to a group so as to ensure a reserve capacity for all beam zones. An additional method of providing changes to system capacity involves the use of alternative sets of predetermined code groups. That is, a first and second set of code groups for use within the multiple beam zones may be provided. The sets to be utilized may be used based on the time of day, thereby automatically altering the system capacity to account for anticipated changes in typical call loads (e.g., during high commuter traffic times, extra capacity is provided to beam zones covering high-volume roadways, etc.). Care must be taken when transitioning between code group sets to ensure buffer zones are properly maintained during the transition.

Figure 6:
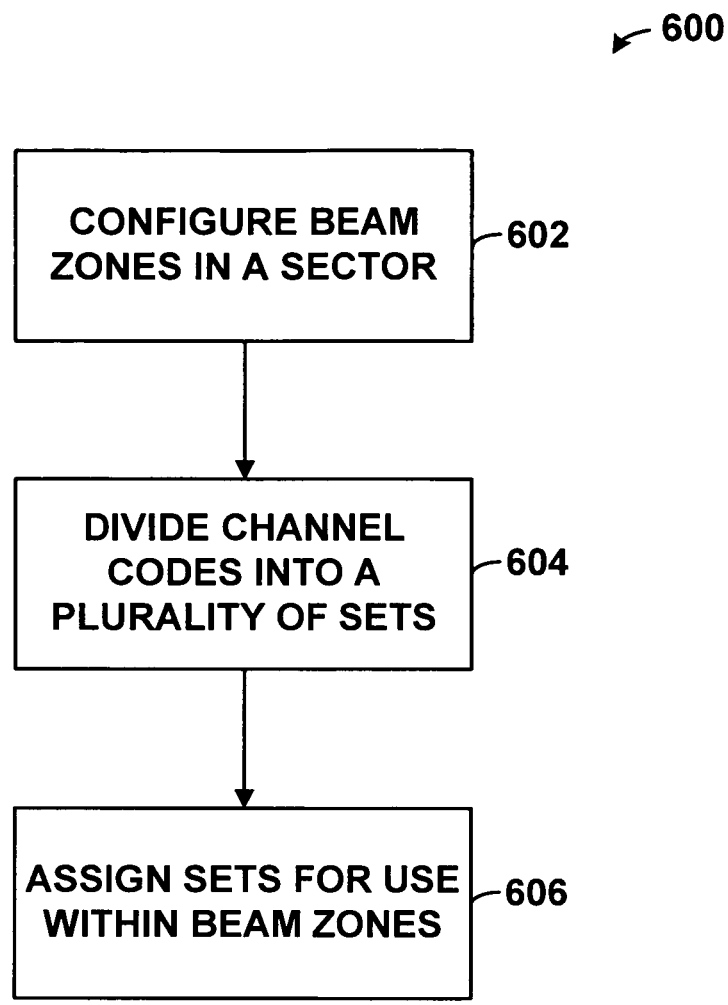
FIG. 6 is a flowchart depicting functional blocks of a method according to one embodiment.

A preferred method 600 of managing code sets is shown in FIG. 6. At step 602 the beam zones are configured to provide coverage to the desired areas of the sector. At step 604, the possible channel codes are divided into groups. Preferably, three groups of codes are provided, but two may be used, or even four or five may be used, depending on the sector layout and desired capacity. The groups need not have the same number of codes. In addition, as discussed above, the groups may be formed dynamically, and/or multiple sets of groups may be provided. At step 604, the groups assigned for use within the beam zones.

In other embodiments, specific groups of codes are not maintained, but codes are instead assigned within beam zones based on their availability. Channel code availability may be determined by examining current channel code assignments of channel codes within the relevant adjacent beam zones. If the channel code is not used within the desired beam zone or in the buffered regions surrounding the desired beam zone, then the code is available for assignment. Once assigned, the code is no longer available for further assignments within the beam zone or the buffer region beam zones.

Alternatively, code assignment and availability may be tracked explicitly. One example of a data table for use with such a code management method is depicted in FIG. 5B. Note that this table only depicts three channel codes for simplicity, and a larger table would be used for all possible channel codes. The channel codes in the table may refer to Walsh codes or QOFs. In addition, certain Walsh codes might not be included in the pool of possible channel codes in the table because some codes are dedicated for use as pilot channels, paging channels, and other system channels. In FIG. 5B, channel codes are indicated by CC1, CC2, etc, and are listed across the top row of the table. The beam zones BZ1 through BZ6 are listed in the first column of the table. For a given beam zone, the channel code usage is indicated by a flag bit AS (for "assigned" status), and the channel code availability is indicated by a flag bit AV (for "available" status). By convention, a flag bit is referred to as "set" when it has a true logic value (typically a binary one), and a flag bit is referred to as "reset" or "cleared" when the value is false (a binary 0). Thus, when the AS flag is set, it indicates the code is assigned, and when the AV flag is set, it indicates the code is available. For BZ1, channel codes 1 and 3 are in use, and channel code 2 is unavailable. Because channel code 1 is assigned in BZ1, it is not available for reuse until after the buffer regions of BZ2 and BZ3. Thus, the table indicates availability for BZ4, BZ5, and BZ6. The availability of a given channel code may also be conditioned on the mobility of the user, as described below.

When a new channel code is needed for assignment to a mobile in a particular beam zone, the method may select any channel code where the AV flag is set. Once the channel code is selected and assigned, the corresponding AS bit is set (indicating the code is presently assigned) and the AV bit is cleared. In addition, the AV bit is cleared for the beam zones in the corresponding buffer regions to ensure the same code is not later assigned within the buffer beam zones.

When a channel code is released, or unassigned, in a given beam zone, the corresponding AS bit is cleared. In addition, the AV bit is set for the buffer beam zones, but only after ensuring that the beam zones are not acting as a buffer for another beam zone. As an example, consider the case where the system releases channel code 3 in beam zone 1, and the AS bit for BZ1 is cleared. Prior to setting the AV flags in BZ2 and BZ3, the AS bit for BZ4 must be checked. Upon examination, the AS bit for BZ4 is determined to be in the set state, indicating it is presently being used in BZ4. Thus, channel code 3 is not available for use in BZ2 and BZ3, and the corresponding AV flags must remain cleared.

Thus, depending on the required buffer zones, dynamic assignment of channel codes from and available pool of codes may include tracking currently assigned channel codes and preferably the channel code availability for each of the two or more beam zones. In sectors having numerous beam overlapping zones, the method may require examination of up to four or more adjacent beam zones within the sector to ensure interference is minimized.

The dynamic assignment from a pool of codes may also impose limitations on the beam zone to reserve system capacity. That is, each beam zone may be required to have a minimum number of available channel codes (i.e., one or more), and a given channel code might be restricted from assignment if it would result in a zone having no available codes. Alternatively, may impose a limitation of a maximum number of channel codes assigned in a given beam zone.

In other alternative embodiments, the required reserve capacity may also be dynamic. For instance, the maximum number of assigned channel codes for each beam zone (or the minimum available codes) may be dynamically adjusted, based on the time of day, the number of calls, or other sector and cell-specific conditions or statistics.

Figures 7A, 7B:
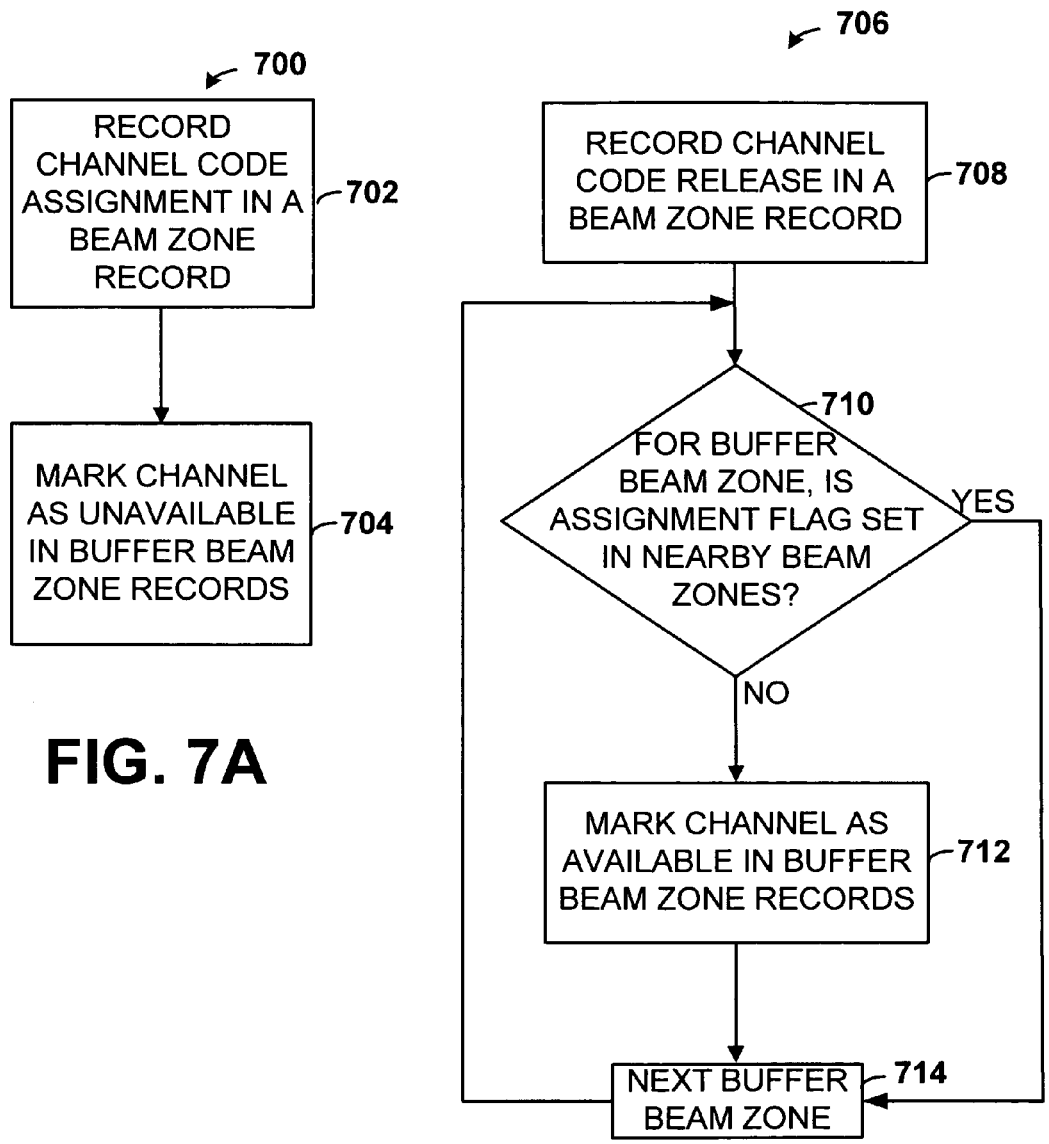
FIGS. 7A and 7B are flowcharts depicting functional blocks of a method according to alternative embodiments.

Preferred methods 700, 706 of channel code management are shown in FIGS. 7A and 7B. In FIG. 7A, channel code assignments are tracked by recording the assignment in the corresponding beam zone record. In embodiments utilizing the explicit tracking of availability (which is optional), the availability flag is cleared in the relevant buffer beam zone records. The relevant buffer beam zones for a given beam zone may be determined by default, such as by a rule that defines the buffer zones to be one, or preferably two, adjacent beam zones on each side of the given beam zone. Alternatively, an additional field may be added to the table of FIG. 5B to explicitly identify the required or desired buffer zones for each beam zone.

Method 706 depicts a method whereby channel codes are released by recording the change in assignment in the given beam zone record, as shown by step 708. In embodiments where availability is also tracked, the method may include setting the AV bits for the buffer beam zones. The AV bits are set because the buffer zones are no longer needed. Of course, the AV bits are not set as shown in step 712 without verification that the channel code is not presently assigned in nearby beam zones as shown in decision block 710. "Nearby" beam zones are those zones that would also use the beam zone under consideration as a buffer zone. The remaining buffer zones are checked as indicated by the block 714.

In the example of FIG. 5B (having a preferred buffer of two intervening beam zones), when channel code 1 in BZ1 is released, then for the purposes of setting the AV bit for BZ2, beam zone BZ4 is considered to be "nearby", whereas BZ5 is not. For the purpose of setting the AV bit for buffer zone BZ3, beam zone BZ5 is considered to be "nearby".

Thus, if the channel code is in use in a nearby beam zone, the beam zone under consideration is acting as a buffer zone for the nearby beam zone, and the method will not set the AV bit.

Figure 8:
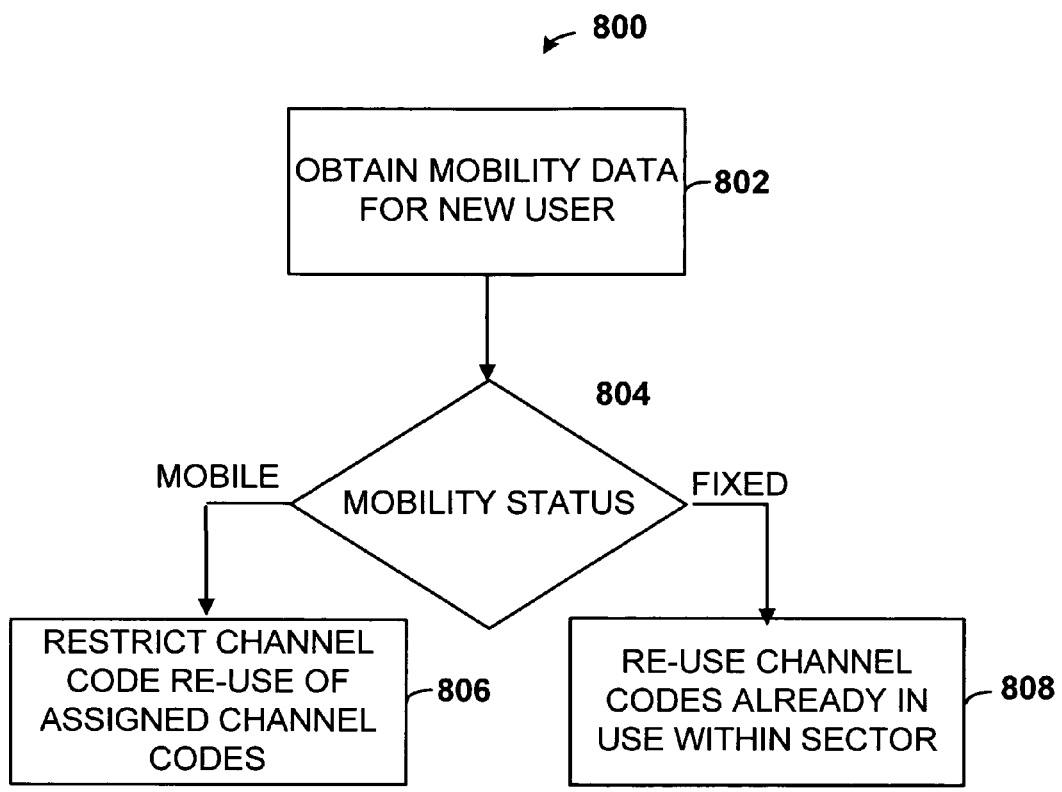
FIG. 8 is a flowchart of an alternative method of assigned channel codes.

With respect to FIG. 8, an alternative method 800 of channel code re-use that factors in a user's mobility will be described. When an MS requests a channel code assignment, the system may first obtain mobility data corresponding to the new user, as depicted in step 802. The mobility data may be obtained using any of a number of techniques described above, as well as alternatives known to those of skill in the art. If the status of the MS is "mobile", as determined at step 804, then the system may restrict the channel code assignment to only those channel codes that are not already assigned (e.g., channel codes that do not have any bits set in the AS field of FIG. 5b), as depicted in step 806. If, however, the test at step 804 indicates that the status of the MS is "fixed", then channel codes indicating availability in the beam zone may be assigned to the MS, even if they are already assigned in another beam zone within the sector.

D. Other Examples

Those skilled in the art to which the present invention pertains may make modifications resulting in other embodiments employing principles of the present invention without departing from its spirit or characteristics. Accordingly, the described embodiments are to be considered in all respects only as illustrative, and not restrictive, and the scope of the present invention is, therefore, indicated by the appended claims rather than by the foregoing description. Consequently, while the present invention has been described with reference to particular embodiments, modifications apparent to those skilled in the art would still fall within the scope of the invention.

We claim:

1. A method of increasing forward channel capacity in a CDMA communication system comprising:

configuring directional antennas in a cell sector to provide multiple beam zones in the cell sector, wherein the multiple beam zones include at least a first beam zone, a second beam zone, and at least two intervening beam zones between the first beam zone and the second beam zone, wherein the at least two intervening beam zones include a third beam zone that overlaps with at least a portion of the first beam zone, and wherein the at least two intervening beam zones include a fourth beam zone that overlaps with at least a portion of the second beam zone;

assigning orthogonal channel codes of a set of orthogonal channel codes to a plurality of channel code groups, wherein the orthogonal channel codes are useable by mobile stations operating within the cell sector, and wherein the plurality of channel code groups includes at least (i) a first code group including a first plurality of orthogonal channel codes of the set of orthogonal channel codes, (ii) a second code group including a second plurality of channel codes of the set of orthogonal channel codes, and (iii) a third code group including a third plurality of channel codes of the set of orthogonal channel codes, wherein the channel codes of the first code group are distinct from the channel codes of the second code group and the third code group, and wherein the channel codes of the second code group are distinct from the channel codes of the third code group;

assigning the first code group to the first beam zone and to the second beam zone such that the channel codes of the first code group are useable within the first beam zone and the second beam zone, assigning the second code group to the third beam zone such that the channel codes of the second code group are useable within the third beam zone, and assigning the third code group to the fourth beam zone such that the channel codes of the third code group are useable within the fourth beam zone, and while a given channel code of the first code group is in use by a first mobile station within the first beam zone, assigning the given channel code to a second mobile station within the second beam zone so that the given channel code is simultaneously in use by the first base station in the first beam zone and by the second mobile station in the second beam zone.

2. The method of claim 1, wherein the channel codes are dynamically assigned to the first code group, the second code group, and the third code group for use within the multiple beam zones.

3. The method of claim 2 wherein the number of channel codes that may be assigned for use in each beam zone of the multiple beam zones is subject to a maximum number of channel codes.

4. The method of claim 3, wherein the maximum number of channel codes for each beam zone is dynamically adjusted.

5. The method of claim 4, wherein the maximum number of channel codes for each beam zone is adjusted in response to call statistics of the sector.

6. The method of claim 4, wherein the maximum number of channel codes for each beam zone is adjusted in response to time of day.

7. The method of claim 1, wherein the channel codes are statically assigned for use within the multiple beam zones.

8. The method of claim 7, wherein the first code group, the second code group, and third code group are periodically modified.

9. The method of claim 8, wherein the periodic modification of the first code group, the second code group, and the third code group is based on statistical usage patterns.

10. The method of claim 1, wherein the first code group, the second code group, and the third code group each comprise a different number of channel codes.

11. The method of claim 1, further comprising:

prior to assigning the given channel code to a second mobile station within the second beam zone, making a determination that a location of the second mobile station is fixed.

* * * * *